ized|

United States Patent
He et al.

(10) Patent No.: US 10,993,181 B2
(45) Date of Patent: Apr. 27, 2021

(54) TECHNIQUES AND APPARATUSES FOR POWER MANAGEMENT VIA CROSS-RAT SIGNALING IN A NON-STANDALONE CONFIGURATION

(71) Applicant: QUALCOMM Incorporated, San Diego, CA (US)

(72) Inventors: Linhai He, San Diego, CA (US); Ozcan Ozturk, San Diego, CA (US); Gavin Bernard Horn, La Jolla, CA (US); Keiichi Kubota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 16/058,287

(22) Filed: Aug. 8, 2018

(65) Prior Publication Data
US 2019/0053160 A1 Feb. 14, 2019

Related U.S. Application Data

(60) Provisional application No. 62/544,384, filed on Aug. 11, 2017.

(51) Int. Cl.
*H04W 76/27* (2018.01)
*H04W 52/02* (2009.01)
(Continued)

(52) U.S. Cl.
CPC ... *H04W 52/0229* (2013.01); *H04W 52/0206* (2013.01); *H04W 52/0216* (2013.01);
(Continued)

(58) Field of Classification Search
CPC ......... H04W 52/0206; H04W 52/0216; H04W 52/0229; H04W 76/27; H04W 88/06; H04W 88/10
See application file for complete search history.

(56) References Cited

U.S. PATENT DOCUMENTS

| 2014/0220926 A1* | 8/2014 | Shikama | H04W 52/0277 455/404.1 |
| 2015/0304950 A1* | 10/2015 | Li | H04W 52/0216 370/311 |

(Continued)

OTHER PUBLICATIONS

International Search Report and Written Opinion — PCT/US2018/046016 — ISA/EPO — Oct. 23, 2018 (175760W0).

*Primary Examiner* — Phuc H Tran
(74) *Attorney, Agent, or Firm* — Qualcomm Incorporated

(57) ABSTRACT

Certain aspects of the present disclosure generally relate to wireless communication. In some aspects, a first base station for wireless communication, associated with a first radio access technology (RAT), may generate a message to cause a user equipment to wake up from a power saving state or to reconfigure a cycle associated with the power saving state, wherein the message includes an indication that the user equipment is to wake up from the power saving state or to reconfigure the cycle; and/or transmit the message toward the user equipment via a second base station, associated with a second RAT and the user equipment, to cause the user equipment to wake up from the power saving state or reconfigure the cycle. Numerous other aspects are provided.

30 Claims, 9 Drawing Sheets

(51) Int. Cl.
  *H04B 7/06*     (2006.01)
  *H04W 88/06*    (2009.01)
  *H04W 88/10*    (2009.01)

(52) U.S. Cl.
  CPC ........... *H04W 76/27* (2018.02); *H04B 7/0617* (2013.01); *H04W 88/06* (2013.01); *H04W 88/10* (2013.01)

(56) References Cited

U.S. PATENT DOCUMENTS

| | | | |
|---|---|---|---|
| 2016/0277957 A1 | 9/2016 | Patel et al. | |
| 2016/0295502 A1 | 10/2016 | Yoon et al. | |
| 2018/0249390 A1* | 8/2018 | Agiwal | H04L 47/34 |
| 2018/0332659 A1* | 11/2018 | Hwang | H04W 24/10 |
| 2019/0045408 A1* | 2/2019 | Kim | H04W 76/22 |
| 2019/0166576 A1* | 5/2019 | Kim | H04W 36/08 |
| 2019/0281580 A1* | 9/2019 | Rune | H04W 68/005 |
| 2019/0306759 A1* | 10/2019 | Berggren | H04W 52/0229 |
| 2019/0335421 A1* | 10/2019 | Park | H04W 8/24 |
| 2020/0196379 A1* | 6/2020 | Park | H04W 8/18 |

\* cited by examiner

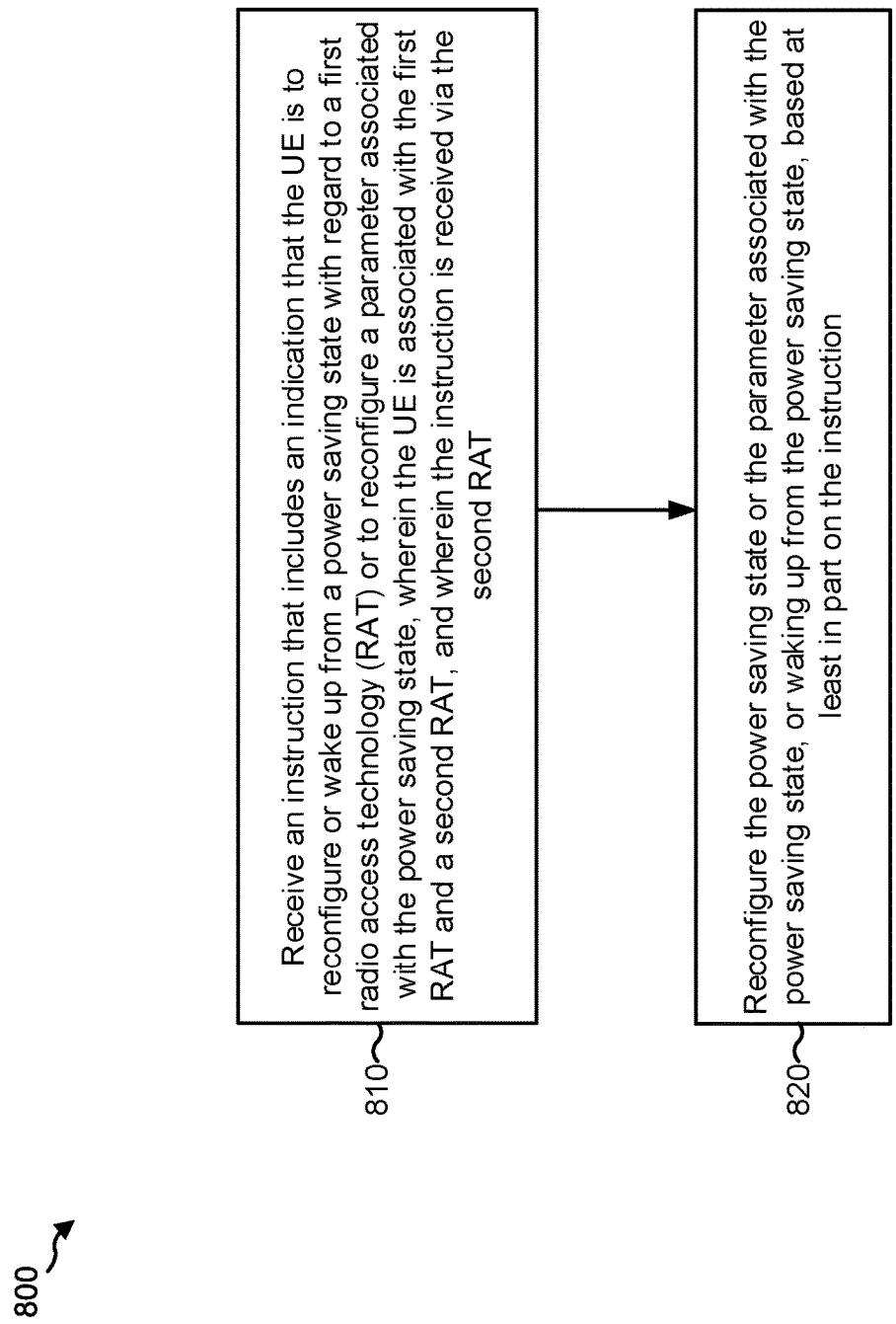

TECHNIQUES AND APPARATUSES FOR POWER MANAGEMENT VIA CROSS-RAT SIGNALING IN A NON-STANDALONE CONFIGURATION

CROSS-REFERENCE TO RELATED APPLICATIONS UNDER 35 U.S.C. § 119

This application claims priority to Provisional Patent Application No. 62/544,384, filed on Aug. 11, 2017, entitled "TECHNIQUES AND APPARATUSES FOR POWER MANAGEMENT VIA CROSS-RAT SIGNALING IN A NON-STANDALONE CONFIGURATION," which is hereby expressly incorporated by reference herein.

FIELD OF THE DISCLOSURE

Aspects of the present disclosure generally relate to wireless communication, and more particularly to techniques and apparatuses for power management via cross-radio access technology (RAT) signaling in a non-standalone (NSA) configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a first base station associated with a first RAT may include generating a message to cause a user equipment to wake up from a power saving state or to reconfigure a cycle associated with the power saving state, wherein the message includes an indication that the user equipment is to wake up from the power saving state or to reconfigure the cycle; and transmitting the message toward the user equipment via a second base station, associated with a second RAT and the user equipment, to cause the user equipment to wake up from the power saving state or reconfigure the cycle.

In some aspects, a first base station for wireless communication, associated with a first RAT, may include a memory and one or more processors operatively coupled to the memory, the memory and the one or more processors configured to generate a message to cause a user equipment to wake up from a power saving state or to reconfigure a cycle associated with the power saving state, wherein the message includes an indication that the user equipment is to wake up from the power saving state or to reconfigure the cycle; and transmit the message toward the user equipment via a second base station, associated with a second RAT and the user equipment, to cause the user equipment to wake up from the power saving state or reconfigure the cycle.

In some aspects, a non-transitory computer-readable medium may store one or more instructions for wireless communication. The one or more instructions, when executed by one or more processors of a first base station associated with a first RAT, may cause the one or more processors to generate a message to cause a user equipment to wake up from a power saving state or to reconfigure a cycle associated with the power saving state, wherein the message includes an indication that the user equipment is to wake up from the power saving state or to reconfigure the cycle; and transmit the message toward the user equipment via a second base station, associated with a second RAT and the user equipment, to cause the user equipment to wake up from the power saving state or reconfigure the cycle.

In some aspects, an apparatus for wireless communication associated with a first RAT may include means for generating a message to cause a user equipment to wake up from a power saving state or to reconfigure a cycle associated with the power saving state, wherein the message includes an indication that the user equipment is to wake up from the power saving state or to reconfigure the cycle; and means for transmitting the message toward the user equipment via a base station, associated with a second RAT and the user equipment, to cause the user equipment to wake up from the power saving state or reconfigure the cycle.

In some aspects, a method for wireless communication performed by a first base station associated with a first RAT may include receiving a message to cause a user equipment to wake up from a power saving state or reconfigure a cycle associated with the power saving state, wherein the message includes an indication that the user equipment is to wake up from the power saving state or reconfigure the cycle, and wherein the message is received from a second base station associated with a second RAT; and transmitting an instruction to cause the user equipment to wake up from the power saving state or reconfigure the cycle based at least in part on the message.

In some aspects, a first base station for wireless communication, associated with a first RAT, may include a memory and one or more processors operatively coupled to the memory, the memory and the one or more processors configured to receive a message to cause a user equipment to wake up from a power saving state or reconfigure a cycle associated with the power saving state, wherein the message includes an indication that the user equipment is to wake up from the power saving state or reconfigure the cycle, and wherein the message is received from a second base station associated with a second RAT; and transmit an instruction to cause the user equipment to wake up from the power saving state or reconfigure the cycle based at least in part on the message.

In some aspects, a non-transitory computer-readable medium may store one or more instructions for wireless communication. The one or more instructions, when executed by one or more processors of a first base station associated with a first RAT, may cause the one or more processors to receive a message to cause a user equipment to wake up from a power saving state or reconfigure a cycle associated with the power saving state, wherein the message includes an indication that the user equipment is to wake up from the power saving state or reconfigure the cycle, and wherein the message is received from a second base station associated with a second RAT; and transmit an instruction to cause the user equipment to wake up from the power saving state or reconfigure the cycle based at least in part on the message.

In some aspects, an apparatus for wireless communication associated with a first RAT may include means for receiving a message to cause a user equipment to wake up from a power saving state or reconfigure a cycle associated with the power saving state, wherein the message includes an indication that the user equipment is to wake up from the power saving state or reconfigure the cycle, and wherein the message is received from a base station associated with a second RAT; and means for transmitting an instruction to cause the user equipment to wake up from the power saving state or reconfigure the cycle based at least in part on the message.

In some aspects, a method for wireless communication performed by a user equipment (UE) may include receiving an instruction that includes an indication that the UE is to reconfigure or wake up from a power saving state with regard to a first radio access technology (RAT) or to reconfigure a cycle associated with the power saving state, wherein the UE is associated with the first RAT and a second RAT, and wherein the instruction is received via the second RAT; and reconfiguring the power saving state or the cycle associated with the power saving state, or waking up from the power saving state, based at least in part on the instruction.

In some aspects, a UE for wireless communication may include a memory and one or more processors operatively coupled to the memory, the memory and the one or more processors configured to receive an instruction that includes an indication that the UE is to reconfigure or wake up from a power saving state with regard to a first radio access technology (RAT) or to reconfigure a cycle associated with the power saving state, wherein the UE is associated with the first RAT and a second RAT, and wherein the instruction is received via the second RAT; and reconfigure the power saving state or the cycle associated with the power saving state, or waking up from the power saving state, based at least in part on the instruction.

In some aspects, a non-transitory computer-readable medium may store one or more instructions for wireless communication. The one or more instructions, when executed by one or more processors of a UE, may cause the one or more processors to receive an instruction that includes an indication that the UE is to reconfigure or wake up from a power saving state with regard to a first radio access technology (RAT) or to reconfigure a cycle associated with the power saving state, wherein the UE is associated with the first RAT and a second RAT, and wherein the instruction is received via the second RAT; and reconfigure the power saving state or the cycle associated with the power saving state, or waking up from the power saving state, based at least in part on the instruction.

In some aspects, an apparatus for wireless communication associated with a first RAT may include means for receiving an instruction that includes an indication that the apparatus is to reconfigure or wake up from a power saving state with regard to a first radio access technology (RAT) or to reconfigure a cycle associated with the power saving state, wherein the apparatus is associated with the first RAT and a second RAT, and wherein the instruction is received via the second RAT; and means for reconfiguring the power saving state or the cycle associated with the power saving state, or waking up from the power saving state, based at least in part on the instruction.

Aspects generally include a method, apparatus, system, computer program product, non-transitory computer-readable medium, user equipment, wireless communication device, base station, access point, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a UE, in accordance with various aspects of the present disclosure.

DETAILED DESCRIPTION

Figure 1:
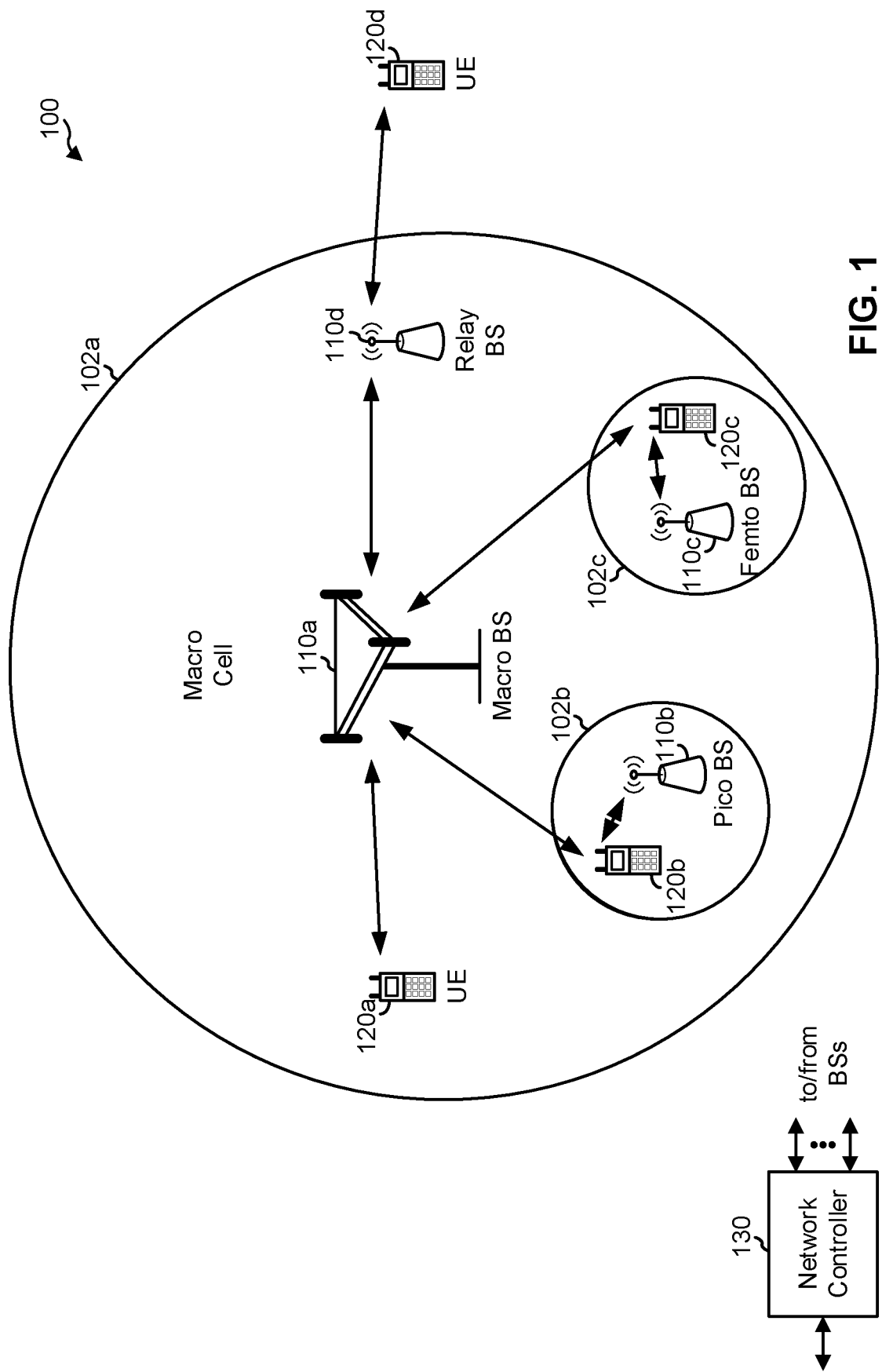
FIG. 1 is a block diagram conceptually illustrating an example of a wireless communication network, in accordance with various aspects of the present disclosure.

In a non-standalone (NSA) configuration, a UE can have separate control entities (e.g., Media Access Control (MAC) entities and/or the like) on two or more radio access technology (RAT) interfaces, such as a Long Term Evolution (LTE) interface and a New Radio (NR) interface. A NSA configuration may comprise a configuration of multiple carriers where at least one of the carriers (e.g., an anchor or primary carrier) is located on dedicated or licensed frequency spectrum, while one or more other carriers (e.g., a secondary carrier) may be located on unlicensed or shared frequency spectrum. Control information may, for example, be carried on the licensed primary carrier, while data may be carried on the secondary unlicensed carrier, as well as the licensed primary carrier.

NSA may be beneficial in situations wherein NR has not been widely deployed, so that the UE can fall back to LTE when no NR connection is available. In some aspects, the NSA configuration may allow the UE to have different and independent discontinuous reception (DRX) configurations for LTE and for NR. DRX is a power saving technique wherein the UE cycles between a paging state wherein the UE communicates with a base station and checks for uplink or downlink traffic, and a power saving state wherein the UE powers down part or all of a communication chain of the UE. One variety of DRX is connected-mode DRX (C-DRX) wherein the UE is in a radio resource control (RRC) connected mode while the DRX cycle is performed.

When traffic load is low and wide bandwidth operation is not needed, the UE's NR interface can be switched to a power saving state (e.g. of the C-DRX mode), and the UE's LTE interface can be used as a primary connection to handle the majority of the UE's traffic. To increase power saving, the NR interface can be configured with a long DRX cycle (e.g., several seconds) so that the NR interface spends a larger amount of time in the power saving state. However, with decreased power consumption comes increased latency. In other words, as the power saving state of the cycle becomes longer, a longer wait may occur for downlink traffic to the UE.

Some techniques and apparatuses described herein may use a first RAT (e.g., LTE/4G) connection of the UE to signal that the UE is to wake up from the power saving state with regard to a second RAT (e.g., 5G/NR) connection of the UE. For example, when a base station associated with the second RAT (e.g., a gNB, etc.) determines to cause the UE to wake up from the power saving state with regard to the NR connection, the base station associated with the second RAT may transmit a wakeup message to the UE via a base station associated with the first RAT (e.g., an eNB, etc.) and the UE's LTE connection. This message may instruct the UE to deactivate or reconfigure a DRX configuration, or to take other actions to switch back to a more active state with regard to the NR interface.

Some techniques and apparatuses described herein may be particularly useful for saving power in NR multi-beam systems. For example, in the DRX mode, multi-beam systems may need to periodically perform a beam management procedure to maintain active beams. However, this beam management procedure may be power expensive due to a beam sweep in the procedure. Furthermore, the DRX cycle may need to comport with latency requirements of some applications, which may shorten the length of the DRX cycle. In sum, these factors cause the beam management procedure to have a high overhead in terms of power consumption. If techniques and apparatuses described herein can be used to wake up a multi-beam system, a DRX cycle of the multi-beam system can be set to a longer duration to offset the overhead of the beam management procedure. Furthermore, by using the techniques and apparatuses described herein, an impact on the maximum latency of the DRX connection may be mitigated (since the UE can be instructed to wake up when data is to be provided on the NR connection).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed. In some aspects, a first BS 110 associated with a first RAT may generate a message to cause a UE 120 to wake up from a power saving state or to reconfigure a cycle associated with the power saving state, wherein the message includes an indication that the UE 120 is to wake up from the power saving state or to reconfigure the cycle; and/or transmit the message toward the UE 120 via a second BS 110, associated with a second RAT and the UE 120, to cause the UE 120 to wake up from the power saving state or reconfigure the cycle. In some aspects, a first BS 110 associated with a first RAT may receive a message to cause a UE 120 to wake up from a power saving state or reconfigure a cycle associated with the power saving state, wherein the message includes an indication that the UE 120 is to wake up from the power saving state or reconfigure the cycle, and wherein the message is received from a second BS 110 associated with a second RAT; and/or transmit an instruction to cause the UE 120 to wake up from the power saving state or reconfigure the cycle based at least in part on the message.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
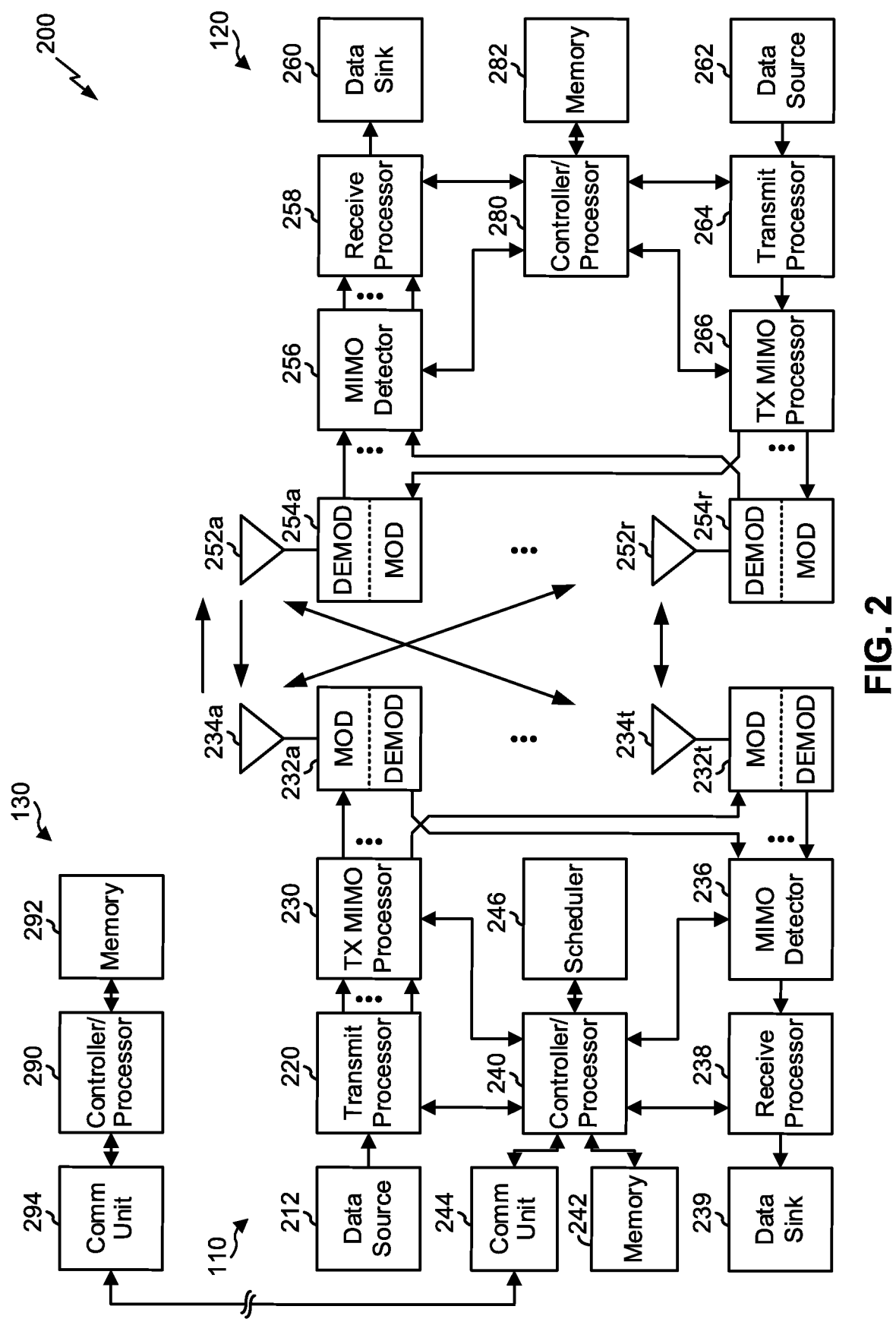
FIG. 2 is a block diagram conceptually illustrating an example of a base station in communication with a user equipment (UE) in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234*a* through 234*t*, and UE 120 may be equipped with R antennas 252*a* through 252*r*, where in general T≥1 and R≥1. In some aspects, one or more components of UE 120 may be included in a housing.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to certain aspects described in more detail below, the synchronization signals can be generated with location encoding to convey additional information.

At UE 120, antennas 252*a* through 252*r* may receive the downlink signals from BS 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. BS 110 may include communication unit 244 and communicate to network controller 130 via communication unit 244. Network controller 130 may include communication unit 294, controller/processor 290, and memory 292. A scheduler 246 may schedule UEs for data transmission on the downlink and/or uplink.

Controllers/processors 240 and 280 and/or any other component(s) in FIG. 2 may direct the operation at BS 110 and UE 120, respectively, to perform power management via cross-RAT signaling in an NSA configuration. For example, controller/processor 240, controller/processor 280, and/or other processors and modules at BS 110 or UE 120, may perform or direct operations of BS 110 or UE 120 to perform power management via cross-RAT signaling in an NSA configuration. For example, controller/processor 240, controller/processor 280, and/or other controllers/processors and modules at BS 110 or UE 120 may perform or direct operations of, for example, process 600 of FIG. 6, process 700 of FIG. 7, process 800 of FIG. 8, and/or other processes as described herein. In some aspects, one or more of the components shown in FIG. 2 may be employed to perform example process 600, example process 700, example process 800, and/or other processes for the techniques described herein. Memories 242 and 282 may store data and program codes for BS 110 and UE 120, respectively. The stored program codes, when executed by controller/processor 240, controller/processor 280, and/or other processors and modules at BS 110 or UE 120, may cause the BS 110 or UE 120 to perform operations described with respect to process 600, process 700, process 800, and/or other processes as described herein.

In some aspects, UE 120 may include means for receiving an instruction that includes an indication that the UE is to reconfigure or wake up from a power saving state with regard to a first radio access technology (RAT) or to reconfigure a cycle associated with the power saving state; means for reconfiguring the power saving state or the cycle associated with the power saving state, or waking up from the power saving state, based at least in part on the instruction; means for performing a beam management operation based at least in part on receiving the instruction; and/or the like. In some aspects, such means may include one or more components of UE 120 described in connection with FIG. 2.

In some aspects, base station 110 may include means for generating a message to cause a user equipment to wake up from a power saving state or to reconfigure a cycle associated with the power saving state; means for transmitting the message toward the user equipment via a second base station, associated with a second RAT and the user equipment, to cause the user equipment to reconfigure or wake up from the power saving state or reconfigure the cycle; means for receiving a message to cause a user equipment to wake up from a power saving state or reconfigure a cycle associated with the power saving state; means for transmitting an instruction to cause the user equipment to wake up from the power saving state or reconfigure the cycle based at least in part on the message; and/or the like. In some aspects, such means may include one or more components of base station 110 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, BS 110 may include means for generating a message to cause a UE 120 to wake up from a power saving state or to reconfigure a cycle associated with the power saving state, means for transmitting the message toward the user equipment via a second BS 110, associated with a second RAT and the user equipment, to cause the UE 120 to wake up from the power saving state or reconfigure the cycle, means for receiving a message to cause a UE 120 to wake up from a power saving state or reconfigure a cycle associated with the power saving state, means for transmitting an instruction to cause the UE 120 to wake up from the power saving state or reconfigure the cycle based at least in part on the message, and/or the like. In some aspects, such means may include one or more components of BS 110 described in connection with FIG. 2.

As indicated above, FIG. 2 is provided merely as an example. Other examples are possible and may differ from what was described with regard to FIG. 2.

Figure 3:
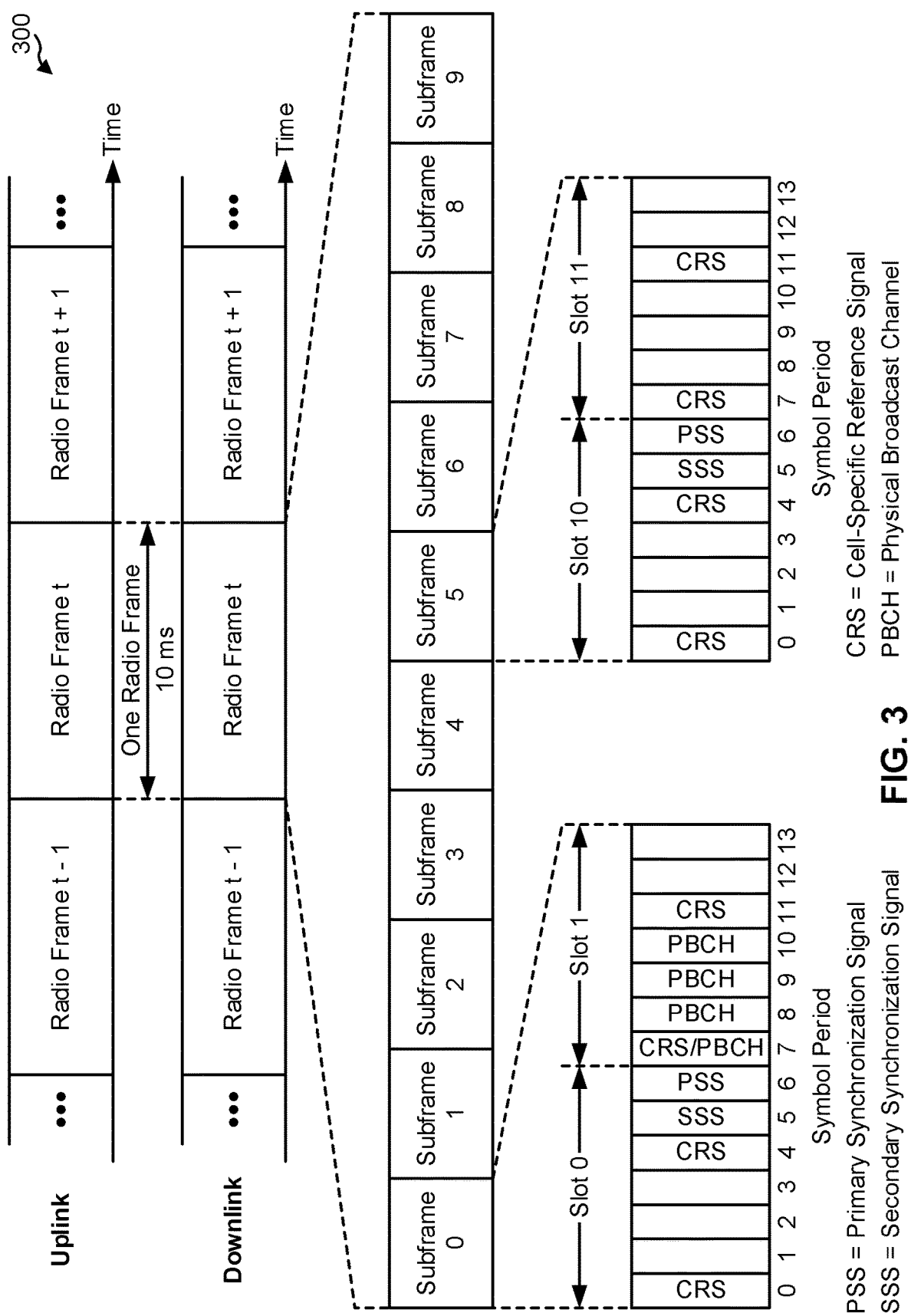
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe. In some aspects, the PDSCH and/or the PDCCH may carry a media access control (MAC) control element (CE), an RRC message, and/or the like, which may indicate an action to perform and/or a configuration to be applied with regard to the UE.

In other systems (e.g., such as NR or 5G systems), a Node B may transmit these or other signals (e.g., a synchronization signal block, a tracking reference signal, and/or the like) in these locations or in different locations of the subframe.

As indicated above, FIG. 3 is provided merely as an example. Other examples are possible and may differ from what was described with regard to FIG. 3.

Figure 4:
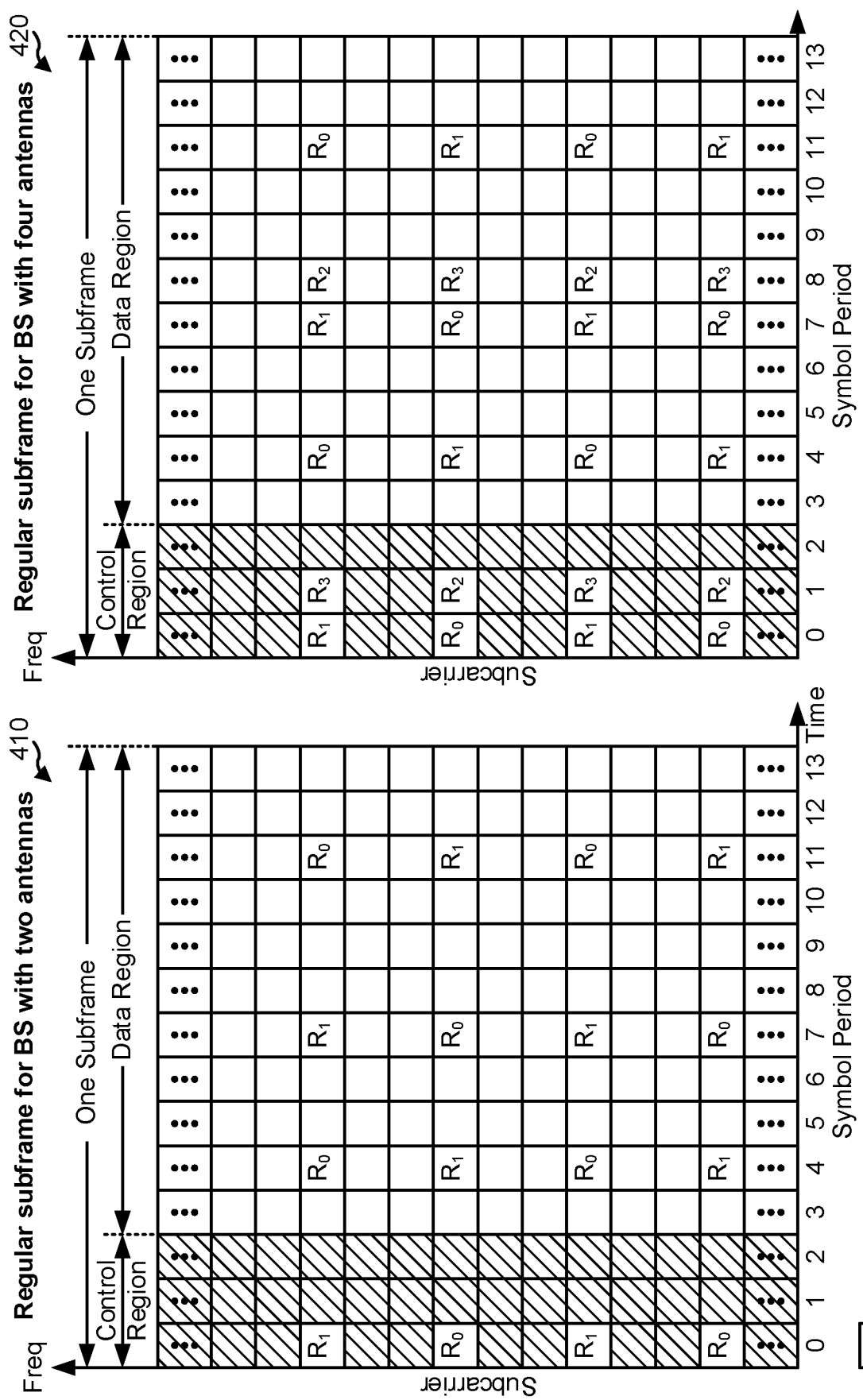
FIG. 4 is a block diagram conceptually illustrating two example subframe formats with the normal cyclic prefix, in accordance with various aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q ∈{0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize orthogonal frequency division multiplexing (OFDM) with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service. UEs having a non-standalone (NSA) configuration may communicate using a NR RAT and another RAT, such as an LTE RAT. However, techniques and apparatuses described herein are not limited to those involving an NR RAT and an LTE RAT, and may be used with any combination of two RATs (e.g., two different RATs, or the same RAT for both RATs). Some techniques and apparatuses described herein may be used for a sub-6 GHz RAT and a mm Wave RAT (e.g., a mmW RAT).

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The radio access network (RAN) may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5A:
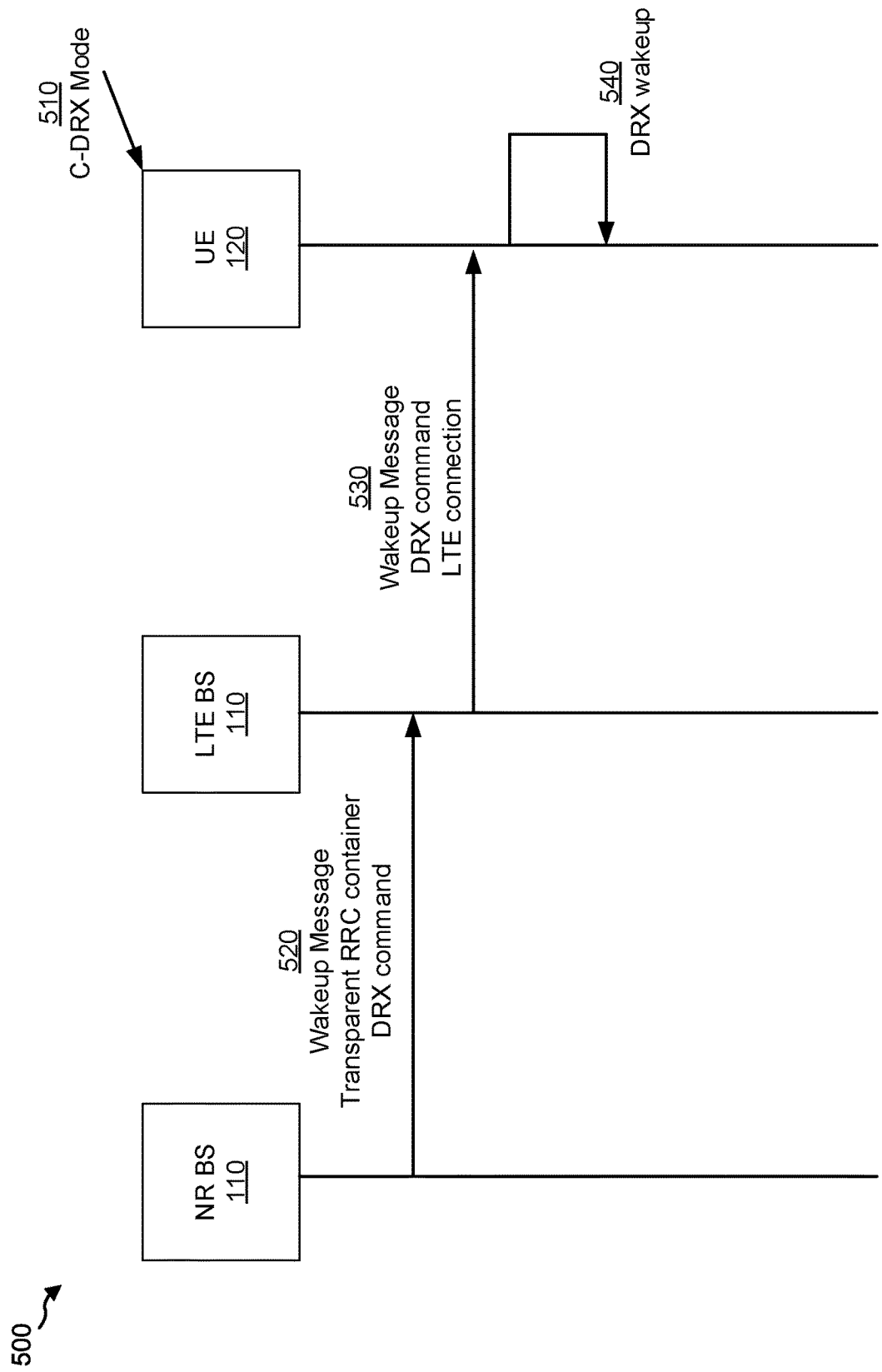
FIGS. 5A and 5B are diagrams illustrating examples of power management via cross-RAT signaling in an NSA configuration, in accordance with various aspects of the present disclosure.
Figure 5B:
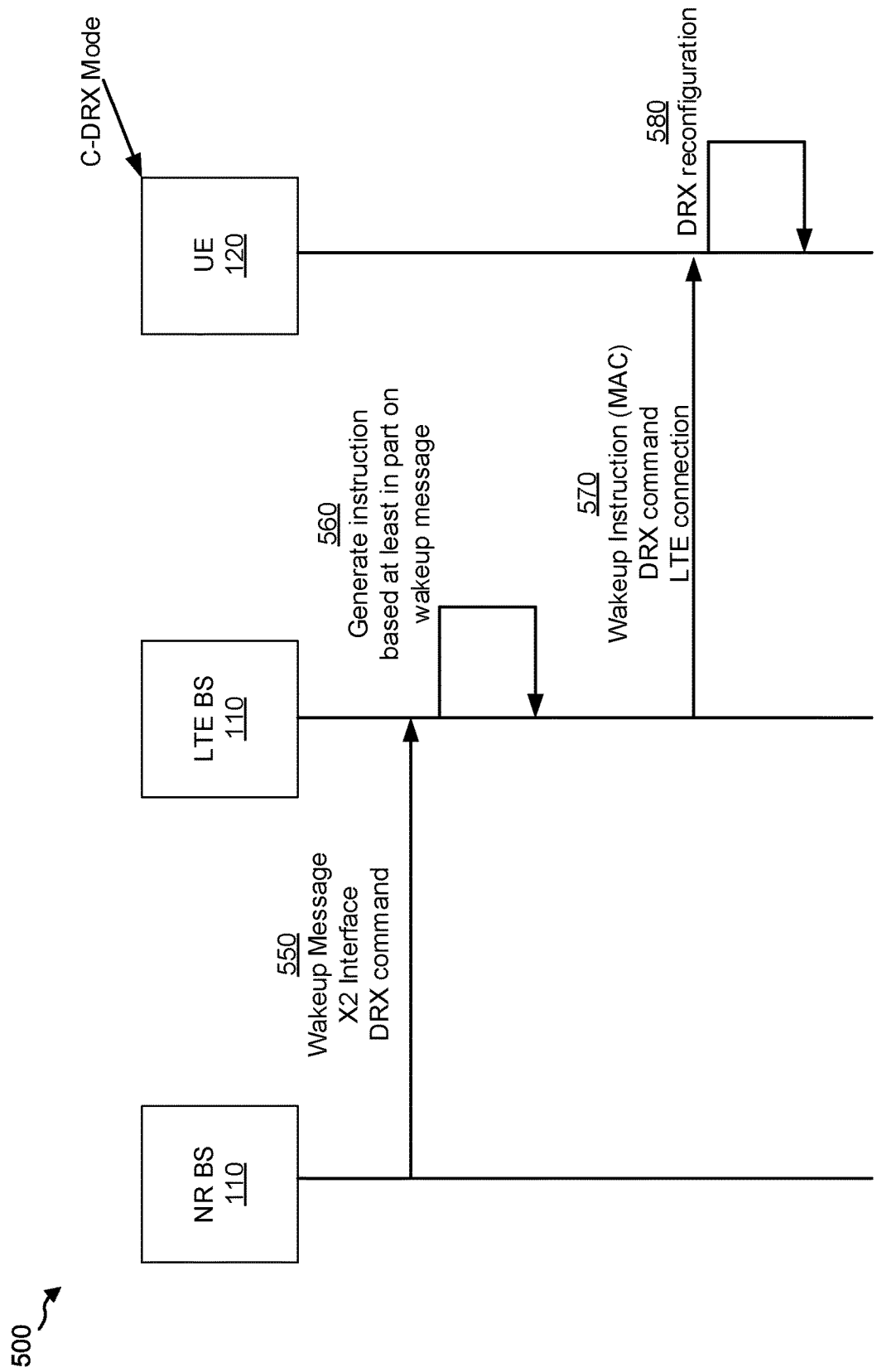

FIGS. 5A and 5B are diagrams illustrating examples 500 of power management via cross-RAT signaling in an NSA configuration, in accordance with various aspects of the present disclosure. As shown, FIGS. 5A and 5B include a NR BS 110 and an LTE BS 110. For example, the NR BS 110 may be associated with a first RAT (e.g., NR), and the LTE BS 110 may be associated with a second RAT (e.g., LTE). In some aspects, the BSs 110 of FIGS. 5A and 5B may be associated with different RATs. FIG. 5A is an example wherein a message, destined for a UE 120, is forwarded from a 5G BS 110 to the UE 120, via an LTE BS 110, based at least in part on a container of the message.

As shown in FIG. 5A, and by reference number 510, the UE 120 may be in a C-DRX mode. For example, the UE 120 may be in the C-DRX mode with regard to a connection with the NR BS 110 (e.g., a 5G/NR connection associated with the NR RAT). This may conserve power of the UE 120 when the NR connection is not in active use. However, when the C-DRX cycle length is long, the UE 120 may experience significant latency when in a power saving state based at least in part on the C-DRX mode, which may be undesirable. Assume that the UE 120 is associated with an active connection with the LTE BS 110, so that the LTE BS 110 can provide instructions or data at a lower latency than the NR BS 110. For example, the UE 120 may be in an active state or may be associated with a shorter DRX cycle with regard to the LTE BS 110 than with regard to the NR BS 110.

As shown by reference number 520, the NR BS 110 may provide a wakeup message to the LTE BS 110 to cause the UE 120 to wake up from the power saving state. As further shown, the NR BS 110 may provide the wakeup message in a transparent RRC container. A transparent RRC container is a header for the wakeup message that causes the LTE BS 110 to forward or relay the wakeup message to the UE 120 without processing a payload of the wakeup message. In this way, an existing LTE implementation can be used without modification of the messaging protocol, which simplifies implementation and conserves network resources. Furthermore, processing resources of the LTE BS 110 are conserved that would otherwise be used to process the payload of the wakeup message.

As further shown, the wakeup message may include a DRX command. In some aspects, the DRX command may indicate, to the UE 120, to wake up from a power saving state. Additionally, or alternatively, the DRX command may indicate to reconfigure a DRX cycle of the UE 120 (e.g., shorten the DRX cycle, shorten the power saving state, etc.). Additionally, or alternatively, the DRX command may indicate that the UE 120 is to listen to or monitor a particular PDCCH. Additionally, or alternatively, the DRX command may indicate to perform a different action.

As shown by reference number 530, the LTE BS 110 may forward or relay the wakeup message to the UE 120. In some aspects, the LTE BS 110 may forward or relay the wakeup message without processing a payload of the wakeup message (e.g., since the wakeup message is associated with a transparent RRC container). As further shown, the LTE BS 110 may forward or relay the wakeup message on an LTE connection. In this way, the NR BS 110 can cause the UE 120 to wake up from a power saving state based at least in part on a message via an active (e.g., LTE) connection with the UE 120, which enables the use of longer DRX cycles with regard to a 5G connection with the UE 120, thereby conserving battery power of the UE 120 while reducing the corresponding latency increase.

As shown by reference number 540, the UE 120 may wake up from the power saving state based at least in part on the wakeup message. In some aspects, the UE 120 may reconfigure the C-DRX mode based at least in part on the wakeup message. In some aspects, the UE 120 may listen to a control channel (e.g., a PDCCH, a physical uplink control channel (PUCCH), etc.) based at least in part on the wakeup message. In some aspects, the UE 120 may perform a random access procedure based at least in part on the wakeup message. In some aspects, the UE 120 may perform an additional or different action based at least in part on the wakeup message.

FIG. 5B is an example wherein the NR BS 110 causes the LTE BS 110 to generate an instruction regarding the C-DRX mode of the UE 120. As shown in FIG. 5B, the UE 120 may be associated with a C-DRX cycle. As described above, assume that the C-DRX cycle corresponds to a 5G/NR connection of the UE 120. Assume further that the UE 120 is associated with an LTE connection with an LTE BS 110 that is associated with a lower latency than the 5G/NR connection.

As shown by reference number 550, the NR BS 110 may provide a wakeup message to the LTE BS 110 to cause the UE 120 to wake up from a power saving state of the C-DRX cycle. For example, the NR BS 110 may provide the wakeup message because the NR BS 110 has a downlink communication to be provided to the UE 120. Additionally, or alternatively, the NR BS 110 may provide the wakeup message to cause the UE 120 to perform a beam management procedure. Additionally, or alternatively, the NR BS 110 may provide the wakeup message for another reason. In some aspects, the wakeup message may identify the UE 120 (e.g., based at least in part on a radio network temporary identifier (RNTI), such as a cell radio RNTI (C-RNTI) and/or the like).

As further shown, the wakeup message may be provided on a backhaul interface between the NR BS 110 and the LTE BS 110, such as an X2 interface and/or the like. For example, the operations described with regard to FIG. 5B may use a new LTE message which may cause the LTE BS 110 to generate an instruction to cause the UE 120 to perform an action with regard to the C-DRX mode. As further shown, the wakeup message may include a DRX command, which is described in more detail in connection with FIG. 5A, above.

As shown by reference number 560, the LTE BS 110 may receive the wakeup message, and may generate a wakeup instruction based at least in part on the wakeup message. In some aspects, the LTE BS 110 may generate the wakeup instruction in a particular protocol layer. For example, the wakeup instruction may be generated in the MAC layer, a layer associated with downlink control information (DCI), and/or the like. This may cause the wakeup instruction to have a lower latency than the message associated with the transparent RRC container described above, since the transparent RRC container is associated with a higher protocol layer than the MAC layer or the DCI. In some aspects, the wakeup instruction may be generated in the RRC layer.

As shown by reference number 570, the LTE BS 110 may provide the wakeup instruction via an LTE connection to the UE 120. As further shown, the wakeup instruction is associated with the MAC layer. For example, the wakeup instruction may be a MAC control element (CE) and/or the like. By providing the wakeup instruction on a lower protocol layer than the transparent RRC container, latency is further reduced. However, the transparent RRC container may not require reconfiguration of the LTE BS 110 to implement the wakeup instruction, which may reduce complexity of implementation and which may conserve processor resources of the LTE BS 110.

As shown by reference number 580, the UE 120 may receive the wakeup instruction, and may reconfigure the C-DRX mode accordingly. In some aspects, the UE 120 may perform another action, such as waking up from a power saving state, performing a random access procedure, deactivating the C-DRX mode, listening to or monitoring a particular channel, and/or the like. In this way, the NRs BS 110 causes the UE 120 to wake up from a power saving state based at least in part on a message on an LTE connection, which reduces latency associated with the power saving state and which enables the usage of longer C-DRX cycles, thereby conserving battery power of the UE 120.

As indicated above, FIGS. 5A and 5B are provided as examples. Other examples are possible and may differ from what was described with respect to FIGS. 5A and 5B.

Figure 6:
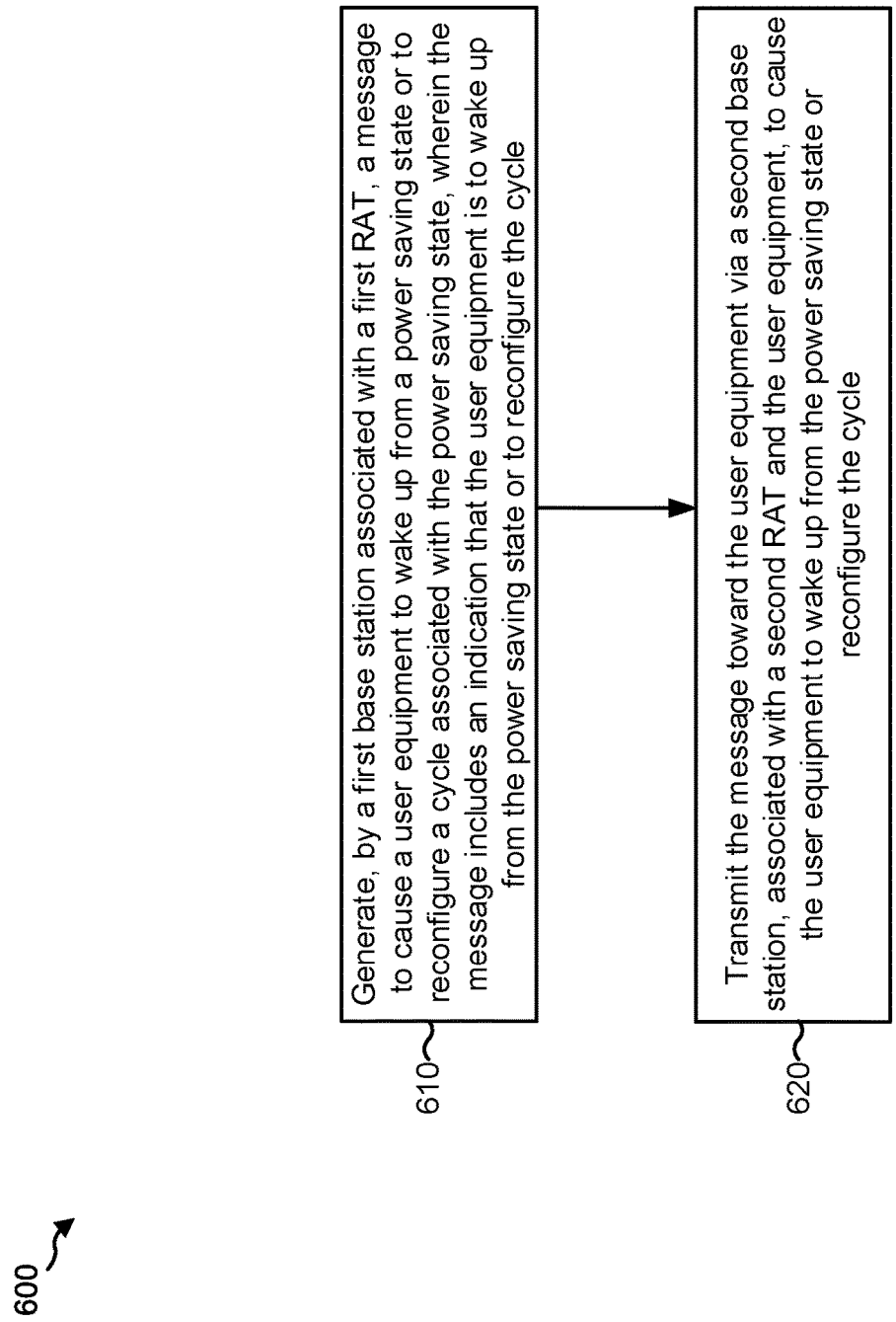
FIG. 6 is a diagram illustrating an example process performed, for example, by a base station, in accordance with various aspects of the present disclosure.

FIG. 6 is a diagram illustrating an example process 600 performed, for example, by a base station, in accordance with various aspects of the present disclosure. Example process 600 is an example where a first base station (e.g., BS 110), associated with a first RAT (e.g., NR) performs power management via cross-RAT signaling in an NSA configuration.

As shown in FIG. 6, in some aspects, process 600 may include generating, by a first base station associated with a first RAT, a message to cause a user equipment to wake up from a power saving state or to reconfigure a cycle associated with the power saving state, wherein the message includes an indication that the user equipment is to wake up from the power saving state or to reconfigure the cycle (block 610). For example, the first base station (e.g., using controller/processor 240, transmit processor 220, TX MIMO processor 230, MOD 232, antenna 234, and/or the like) may generate a message to cause a UE to reconfigure or wake up from a power saving state or to reconfigure a cycle associated with the power saving state. For example, the cycle may include a DRX cycle, a C-DRX cycle, and/or the like. The message may include an indication that the UE is to wake up from the power saving state or reconfigure the cycle. For example, the indication may identify an action to be performed and/or the like. In some aspects, the message may be encapsulated in a transparent RRC container to cause a second base station to forward or relay the message without processing the message.

As shown in FIG. 6, in some aspects, process 600 may include transmitting the message toward the user equipment via a second base station, associated with a second RAT and the user equipment, to cause the user equipment to wake up from the power saving state or reconfigure the cycle (block 620). For example, the first base station (e.g., using controller/processor 240, transmit processor 220, TX MIMO processor 230, MOD 232, antenna 234, and/or the like) may transmit the message to a second base station. The second base station may be associated with a second RAT (e.g., LTE and/or the like), and may be associated with the user equipment. The second base station may forward or relay the message, or may generate and provide an instruction to the UE, to cause the UE to wake up from the power saving state or to reconfigure the cycle. In some aspects, the instruction or the message may cause the user equipment to reconfigure a parameter associated with the power saving state, such as a parameter associated with the cycle of the power saving state. Reconfiguring the parameter associated with the cycle of the power saving state may be referred to herein as reconfiguring the cycle of the power saving state.

Process 600 may include additional aspects, such as any single aspect or any combination of aspects described below and/or in connection with one or more other processes described elsewhere herein.

In some aspects, the message is forwarded to the user equipment by the second base station. In some aspects, the message is provided to the second base station in a radio resource control (RRC) transparent container. In some aspects, the message includes at least one of a media access control (MAC) control element (CE), a radio resource control (RRC) message, or an indication to monitor a control channel. In some aspects, the message is transmitted to the second base station on a backhaul interface. In some aspects, the message identifies the user equipment, and wherein the message causes the second base station to generate an instruction to cause the user equipment to wake up from the power saving state or to reconfigure the cycle. In some aspects, the instruction is transported by at least one of downlink control information (DCI) or a media access control (MAC) control element (CE). In some aspects, the instruction is transported by a radio resource control (RRC) message.

In some aspects, the first RAT is New Radio or a 5th Generation (5G) RAT, and the second RAT is a Long Term Evolution or a 4th Generation (4G) RAT. In some aspects, the first RAT is a same RAT as the second RAT. In some aspects, the first RAT is different than the second RAT. In some aspects, the first RAT operates in a sub-6 GHz band and the second RAT operates in a mm Wave band. In some aspects, the power saving state is with regard to a connection associated with the first radio access technology. In some aspects, the cycle is a discontinuous reception cycle.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
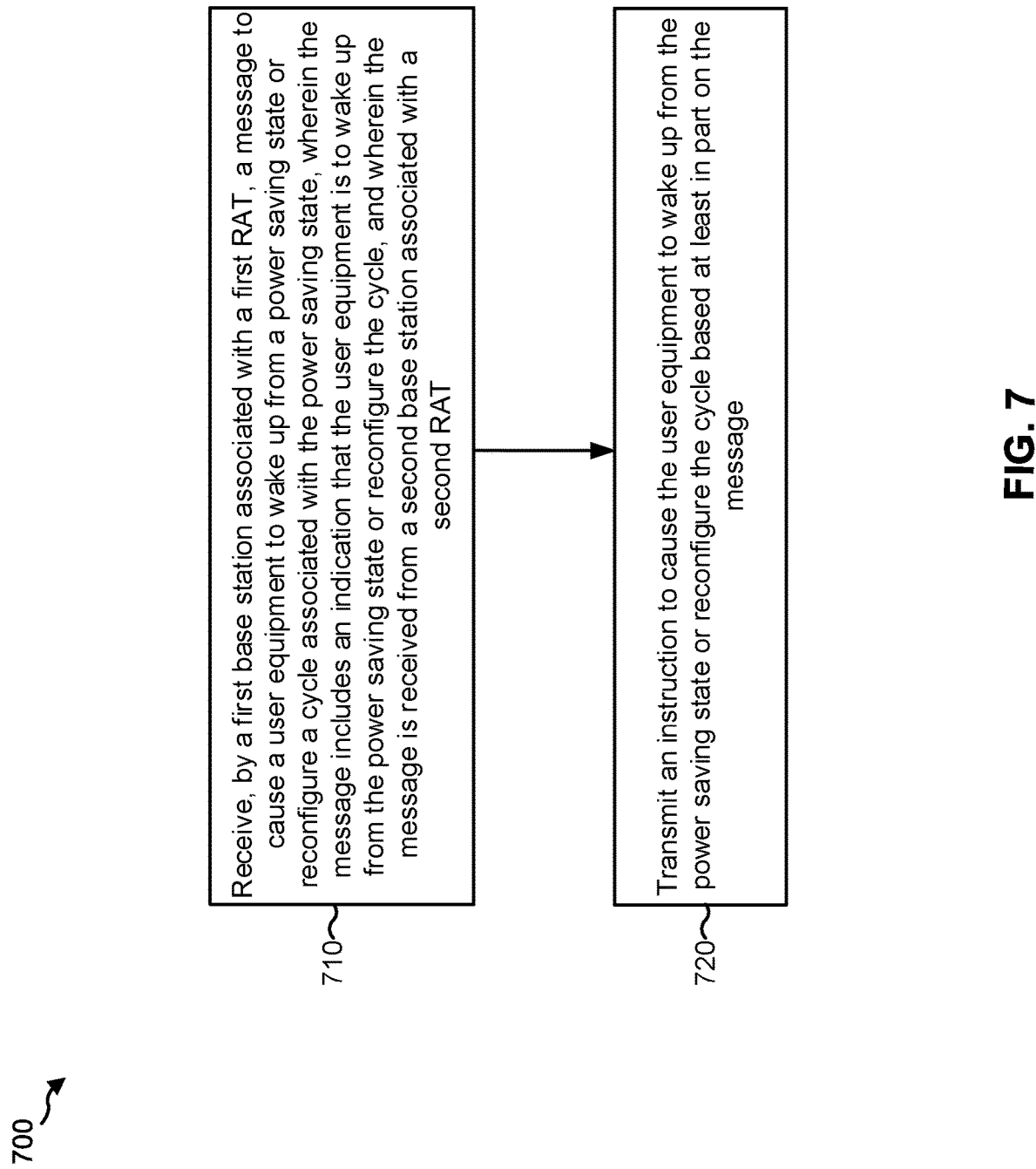
FIG. 7 is a diagram illustrating an example process performed, for example, by a base station, in accordance with various aspects of the present disclosure.

FIG. 7 is a diagram illustrating an example process 700 performed, for example, by a BS, in accordance with various aspects of the present disclosure. Example process 700 is an example where a first base station (e.g., BS 110) associated with a first RAT (e.g., LTE) performs power management via cross-RAT signaling in an NSA configuration.

As shown in FIG. 7, in some aspects, process 700 may include receiving, by a first base station associated with a first RAT, a message to cause a user equipment to wake up from a power saving state or reconfigure a cycle associated with the power saving state, wherein the message includes an indication that the user equipment is to wake up from the power saving state or reconfigure the cycle, and wherein the message is received from a second base station associated with a second RAT (block 710). For example, the first base station (e.g., using antenna 234, DEMOD 232, MIMO detector 236, receive processor 238, controller/processor 240, and/or the like) may receive a message to cause a user equipment to wake up from a power saving state or reconfigure a cycle associated with the power saving state. For example, the message may be received from a second base station associated with a second RAT (e.g., 5G/NR), and the first base station may be associated with a first RAT (e.g., 4G/LTE and/or the like). The message may include an indication that the user equipment is to wake up from the power saving state or reconfigure the cycle. For example, the message may identify an action to be performed by the user equipment.

As shown in FIG. 7, in some aspects, process 700 may include transmitting an instruction to cause the user equipment to wake up from the power saving state or reconfigure the cycle based at least in part on the message (block 720). For example, the second base station (e.g., using controller/processor 240, transmit processor 220, TX MIMO processor 230, MOD 232, antenna 234, and/or the like) may transmit an instruction, to the first base station, to cause the user equipment to wake up from the power saving state or to reconfigure the cycle based at least in part on the message. In some aspects, the first base station may relay or forward the message. In some aspects, the first base station may generate the instruction. In some aspects, the instruction may cause the user equipment to reconfigure a parameter associated with the power saving state, such as a parameter associated with the cycle of the power saving state. Reconfiguring the parameter associated with the cycle of the power saving state may be referred to herein as reconfiguring the cycle of the power saving state.

Process 700 may include additional aspects, such as any single aspect or any combination of aspects described below and/or in connection with one or more other processes described elsewhere herein.

In some aspects, the instruction includes the message. In some aspects, the message is received in a radio resource control (RRC) transparent container. In some aspects, the message includes at least one of a media access control (MAC) control element (CE), a radio resource control (RRC) message, or an indication to monitor a control channel. In some aspects, the message is received by the first base station on a backhaul interface. In some aspects, the instruction includes at least one of downlink control information (DCI) or a media access control (MAC) control element (CE). In some aspects, the instruction includes a radio resource control (RRC) message and a control element for the cycle. In some aspects, the first RAT is a Long Term Evolution or a 4th Generation (4G) RAT, and wherein the second RAT is a New Radio or a 5th Generation (5G) RAT. In some aspects, the first RAT is a same RAT as the second RAT. In some aspects, the first RAT is different than the second RAT. In some aspects, the first RAT operates in a sub-6 GHz band and the second RAT operates in a mm Wave band. In some aspects, the power saving state is with regard to the second RAT.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a UE, in accordance with various aspects of the present disclosure. Example process 800 is an example where a UE (e.g., UE 120) performs power management via cross-RAT signaling in an NSA configuration.

As shown in FIG. 8, in some aspects, process 800 may include receiving an instruction that includes an indication that the UE is to reconfigure or wake up from a power saving state with regard to a first radio access technology (RAT) or to reconfigure a parameter associated with the power saving state, wherein the UE is associated with the first RAT and a second RAT, and wherein the instruction is received via the second RAT (block 810). For example, the UE (e.g., using antenna 252, DEMOD 254, MIMO detector 256, receive processor 258, controller/processor 280, and/or the like) may receive an instruction. The instruction may include an indication that the UE is to reconfigure, configure, or wake up from a power saving state for a first RAT. In some aspects, the indication may indicate that the UE is to reconfigure a parameter associated with the power saving state, such as a parameter associated with a cycle for the power saving state. In some aspects, the instruction may be the indication. The UE may be associated with the first RAT and a second RAT, and the instruction may be received via the second RAT. The instruction may include or be associated with message 530 of FIG. 5A and/or message 570 of FIG. 5B.

As shown in FIG. 8, in some aspects, process 800 may include reconfiguring the power saving state or the parameter associated with the power saving state, or waking up from the power saving state, based at least in part on the instruction (block 820). For example, the UE (e.g., using controller/processor 280 and/or the like) may reconfigure or configure the power saving state or the parameter associated with the power saving state based at least in part on the instruction. In some aspects, the UE (e.g., using controller/processor 280 and/or the like) may wake up from the power saving state based at least in part on the instruction.

Process 800 may include additional aspects, such as any single aspect or any combination of aspects described below and/or in connection with one or more other processes described elsewhere herein.

In some aspects, the UE is associated with a non-standalone configuration for the first RAT and the second RAT. In some aspects, the instruction is received from a base station associated with the second RAT, and wherein the instruction includes a message that was generated by a base station associated with the first RAT. In some aspects, the first RAT operates in a sub-6 GHz band and the second RAT operates in a mm Wave band. In some aspects, the UE (e.g., using antenna 252, DEMOD 254, MIMO detector 256, receive processor 258, controller/processor 280, and/or the like) may perform a beam management operation based at least in part on receiving the instruction.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first base station associated with a New Radio or 5th Generation (5G) radio access technology (RAT), comprising:
   generating a message to cause a user equipment to wake up from a power saving state or to reconfigure a cycle associated with the power saving state,
      wherein the message includes an indication that the user equipment is to reconfigure or wake up from the power saving state or to reconfigure the cycle; and
   transmitting the message toward the user equipment via a second base station, associated with a Long Term Evolution or 4th Generation (4G) RAT and the user equipment, to cause the user equipment to reconfigure or wake up from the power saving state or reconfigure the cycle,
      wherein the message is provided to the second base station in a transparent radio resource control (RRC) container.

2. The method of claim 1, wherein the message is forwarded to the user equipment by the second base station.

3. The method of claim 1, wherein the message includes at least one of:
   a media access control (MAC) control element (CE),
   a radio resource control (RRC) message, or
   an indication to monitor a control channel.

4. The method of claim 1, wherein the message is transmitted to the second base station on a X2 interface.

5. The method of claim 1, wherein the cycle is a discontinuous reception cycle.

6. The method of claim 1, wherein the power saving state is with regard to a connection associated with the New Radio or 5G RAT.

7. The method of claim 1, wherein the cycle is a connected mode discontinuous reception (C-DRX) cycle, and
   wherein the message is transmitted to cause the user equipment to wake up from a power saving state of the C-DRX cycle.

8. The method of claim 1, wherein the message is transmitted to cause the user equipment to monitor a control channel.

9. A method of wireless communication performed by a first base station associated with a Long Term Evolution or 4th Generation (4G) RAT radio access technology (RAT), comprising:
   receiving a message to cause a user equipment to wake up from a power saving state or reconfigure a cycle associated with the power saving state,
      wherein the message includes an indication that the user equipment is to wake up from the power saving state or reconfigure the cycle, and
      wherein the message is received from a second base station associated with a New Radio or 5th Generation (5G) RAT,
      wherein the message is received by the first base station in a transparent radio resource control (RRC) container; and
   transmitting an instruction to cause the user equipment to wake up from the power saving state or reconfigure the cycle based at least in part on the message.

10. The method of claim 9, wherein the instruction includes the message.

11. The method of claim 9, wherein the message includes at least one of:
   a media access control (MAC) control element (CE),
   a radio resource control (RRC) message, or
   an indication to monitor a control channel.

12. The method of claim 9, wherein the message is received by the first base station on a X2 interface.

13. The method of claim 9, wherein the instruction includes at least one of downlink control information (DCI) or a media access control (MAC) control element (CE).

14. The method of claim 9, wherein the instruction includes a radio resource control (RRC) message and a control element for the cycle.

15. The method of claim 9, wherein the power saving state is with regard to the New Radio or 5G RAT.

16. The method of claim 9, wherein the cycle is a connected mode discontinuous reception (C-DRX) cycle, and
   wherein the instruction is transmitted to cause the user equipment to wake up from a power saving state of the C-DRX cycle.

17. The method of claim 9, wherein the instruction is transmitted to cause the user equipment to monitor a control channel.

18. A method of wireless communication performed by a user equipment (UE), comprising:
   receiving an instruction that includes an indication that the UE is to reconfigure or wake up from a power saving state with regard to a New Radio or 5th Generation (5G) radio access technology (RAT) or to reconfigure a parameter associated with the power saving state,
      wherein the UE is associated with the New Radio or 5G RAT and a Long Term Evolution or 4th Generation (4G) RAT,
      wherein the instruction is received via the Long Term Evolution or 4G RAT and from a base station associated with the Long Term Evolution or 4G RAT, and
      wherein the instruction includes a message that was generated by a base station associated with the New Radio or 5G RAT and transmitted to the base station associated with the Long Term Evolution or 4G RAT using a transparent radio resource control (RRC) container; and
   reconfiguring the power saving state or the parameter associated with the power saving state, or waking up from the power saving state, based at least in part on the instruction.

19. The method of claim 18, wherein the UE is associated with a non-standalone configuration for the New Radio or 5G RAT and the Long Term Evolution or 4G RAT.

20. The method of claim 18, further comprising:
performing a beam management operation based at least in part on receiving the instruction.

21. The method of claim 18, wherein reconfiguring the power saving state or the parameter associated with the power saving state, or waking up from the power saving state includes:
waking up from a power saving state of a connected mode discontinuous reception (C-DRX) cycle based at least in part on the instruction.

22. The method of claim 18, wherein reconfiguring the power saving state or the parameter associated with the power saving state, or waking up from the power saving state includes:
monitoring a control channel based at least in part on the instruction.

23. A first base station for wireless communication associated with a New Radio or 5th Generation (5G) radio access technology (RAT), comprising:
a memory; and
one or more processors operatively coupled to the memory, the memory and the one or more processors to:
generate a message to cause a user equipment to wake up from a power saving state or to reconfigure a cycle associated with the power saving state,
wherein the message includes an indication that the user equipment is to reconfigure or wake up from the power saving state or to reconfigure the cycle; and
transmit the message toward the user equipment via a second base station, associated with a Long Term Evolution or 4th Generation (4G) RAT and the user equipment, to cause the user equipment to reconfigure or wake up from the power saving state or reconfigure the cycle,
wherein the message is provided to the second base station in a transparent radio resource control (RRC) container.

24. The first base station of claim 23, wherein the message includes at least one of:
a media access control (MAC) control element (CE),
a radio resource control (RRC) message, or
an indication to monitor a control channel.

25. The first base station of claim 23, wherein the message is forwarded to the user equipment by the second base station.

26. The first base station of claim 23, wherein the message is transmitted to the second base station on a X2 interface.

27. The first base station of claim 23, wherein the cycle is a discontinuous reception cycle.

28. The first base station of claim 23, wherein the power saving state is with regard to a connection associated with the New Radio or 5G RAT.

29. The first base station of claim 23, wherein the cycle is a connected mode discontinuous reception (C-DRX) cycle, and
wherein the message is transmitted to cause the user equipment to wake up from a power saving state of the C-DRX cycle.

30. The first base station of claim 23, wherein the message is transmitted to cause the user equipment to monitor a control channel.

* * * * *